United States Patent
McElroy

[15] 3,637,175
[45] Jan. 25, 1972

[54] CABLE DRAW MECHANISM

[72] Inventor: James A. McElroy, Box 232, Babcock Blvd., Route #4, Gibsonia, Pa. 15044

[22] Filed: Jan. 27, 1970

[21] Appl. No.: 6,200

[52] U.S. Cl. .................................................. 248/55, 248/55
[51] Int. Cl. ........................................................... F16l 3/18
[58] Field of Search .............. 248/55; 254/134.3 FT, 134.3 R; 104/138, 109, 191

[56] References Cited

UNITED STATES PATENTS

| 387,995 | 8/1888 | Pendleton | 104/191 |
| 549,701 | 11/1895 | Brown | 104/191 |
| 1,220,963 | 3/1917 | Derrick | 104/191 |
| 3,426,988 | 2/1969 | Bradley | 248/55 |

FOREIGN PATENTS OR APPLICATIONS

| 111,017 | 7/1900 | Germany | 104/135 |
| 670,158 | 4/1952 | Great Britain | 254/134.3 |
| 414,789 | 12/1966 | Switzerland | 248/55 |

Primary Examiner—Chancellor E. Harris
Attorney—Buell, Blenko & Ziesenheim

[57] ABSTRACT

A cable draw mechanism for use in bends in cable trays comprising a pair of spaced apart arcuate members, said members being connected by spaced radial members at least a part of which carry rotatable thereon a plurality of independent rollers, a plurality of vertical standards on the radially innermost arcuate member, said standards carrying a plurality of rollers lying on an axis transverse to the spaced radial members.

4 Claims, 3 Drawing Figures

PATENTED JAN 25 1972 3,637,175
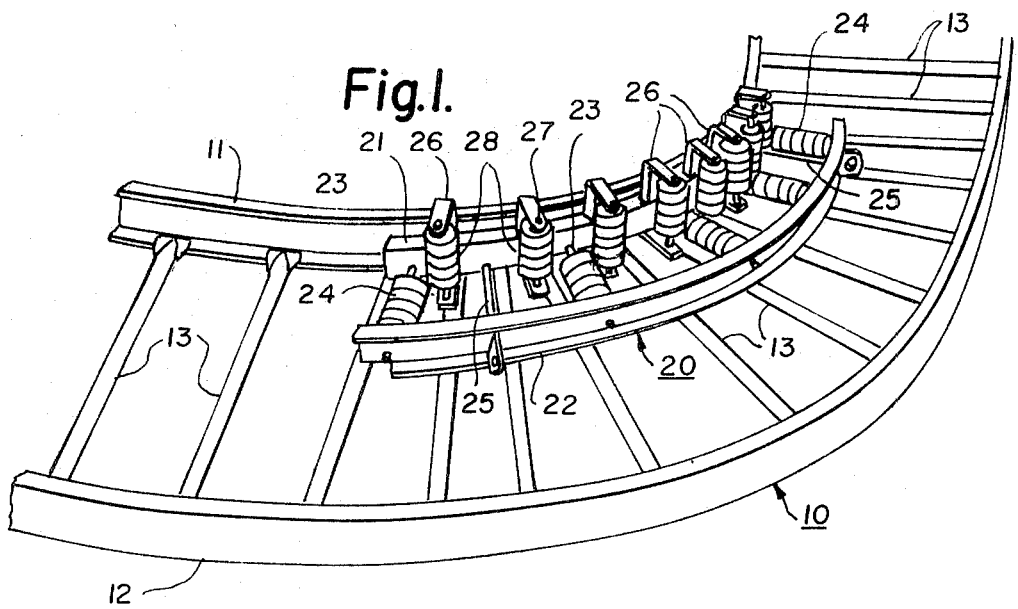
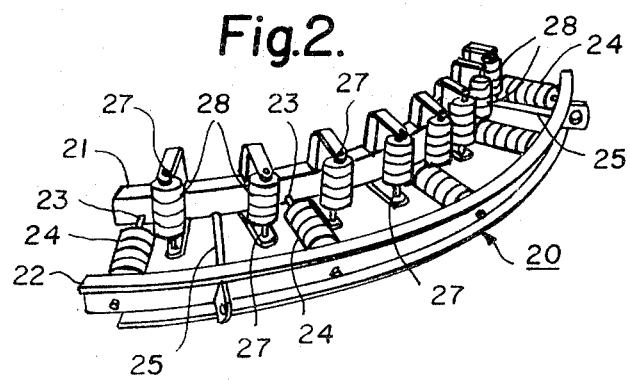
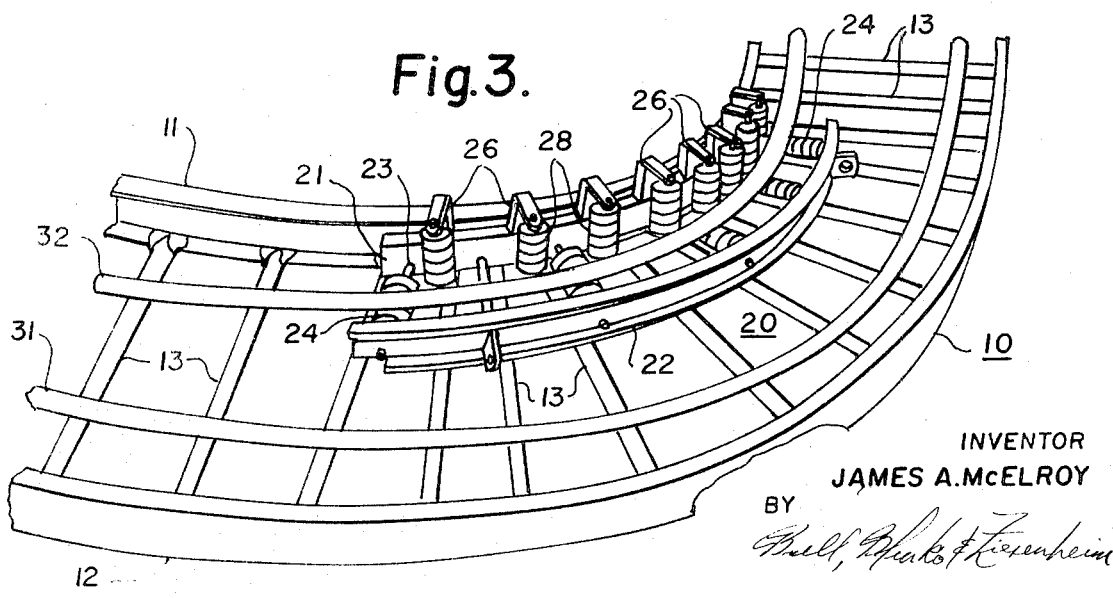
INVENTOR
JAMES A. McELROY
BY
his ATTORNEYS

CABLE DRAW MECHANISM

The present invention relates to cable draw mechanisms and particularly to a cable draw mechanism for cable trays, useful in drawing heavy electrical cables of various size on supports therefor which are generally called cable trays. More particularly the invention relates to a draw mechanism for cable trays which permits heavy cable to be drawn around a corner particularly in the plane of the tray bottom and which eliminates the problem of interference from cables which have been previously drawn.

Cable trays are widely used in supporting industrial electric cables in construction projects. Such electrical cables are of considerable diameter, in many cases 5 or 6 inches or more. In a typical installation a number of electrical cables are laid side by side in the cable tray and are drawn one at a time through the whole tray system around bends as required. These cables are exceedingly difficult to handle because of their large size and frequently great length. The friction of the cable in the tray as well as the bending problem of the cable itself in going around corners is a tremendous problem in the drawing of the cables through the tray. In laying the cables each cable is drawn completely through the cable tray from one end to the other before the next or succeeding cable is similarly drawn or handled. The length of the cable trays presently used may be measured in hundreds or even thousands of feet. The frictional forces which are developed in drawing the cable through such as elongated system of trays becomes extremely large, and entails inordinate amounts of hand labor. The drawing forces which are required are increased further by various types of fittings such as horizontal curved risers, elbows of differing radii, tees, wyes, crosses, reducers and other accessories which find frequent use in a typical installation.

Cable trays as normally used are in the form of a rung or ladder construction of low profile channel in a variety of widths. In conventional practice, drawing of the electrical cables is facilitated to some extent by the use of solid elongated rollers mounted between adjacent rungs of the cable tray and extending entirely across the space between the side rails of the tray. The cables are then successively laid by drawing them one by one across the rollers through the tray which rollers are usually spaced about a dozen feet or so along the length of the tray. These rollers, however, do not solve the problem and a very serious difficulty arises in that after one or two of the cables are laid in the tray the conventional rollers cease to turn, owing to their frictional engagement with previously laid cables, as the next succeeding cable is being pulled. After the cable tray has been fully loaded, it is difficult to remove these rollers which frequently are damaged in the removal operation. Because of their size and particularly their length, these conventional rollers are difficult to manufacture and to store properly, and this problem is complicated by the large number of rollers which are required in this prior art type of practice. Various other combinations of rollers and pulleys have been utilized, incorporating complex clamping or gripping arrangements to hold them in position relative to the cable tray. However, these prior practices have been cumbersome inconvenient, and inefficient in application, and have not met with success. Typical of the fixed rollers or pulleys which have been proposed in the prior art in an attempt to solve some of the problems which are mentioned above, are those disclosed in U.S. Pat. to Bradley et al. No. 3,426,988. This patent discloses an array of pulleys which are secured in tandem across the width of the cable tray. This arrangement is an improvement over the practices which are outlines above using a continuous roller. However, the Bradley type device, while solving a portion of the problem, fails to solve all of the problem. For example, a large expenditure of time is required in securing and removing the individual rollers from the cable tray. Although the Bradley rollers are secured from the side of the cable tray opposite from the cables laid therein, the rollers must be removed from the open side of the tray by spreading or lifting or otherwise rearranging the heavy cables, and this must be done at each point where a set of rollers is installed. This takes a considerable period of time and is less than satisfactory.

There are other cable and conduit drawing aids which have been used in the past, but these also fail to show a satisfactory solution to the problem. For example, U.S. Pats. to Tyler No. 1,097,273 and Kearney No. 1,766,254 show different attempts to solve the problem. In Tyler, supports are provided which are useful for laying closely spaced pipes, conduits and the like. They are, however, not appropriate for electrical cables and they involve considerable difficulty in removing them from beneath the cable. The Kearney patent shows a multiple place cable rack for adjustably supporting one or more cables in a vertical array. Here again, however, the structure is inappropriate for large electrical cables or for use with a cable tray, and extreme difficulty would be experienced in attempting to use and remove the Kearney apparatus from a tray.

The present invention overcomes the difficulties of the prior art, with the provision of a cable draw mechanism which can be mounted on and readily removed from a typical cable tray structure whether it be of the ladder type or of the other types of structures such as shown in U.S. Pat. No. 3,137,468. The structure provides quick means for attaching, and for bearing the pull so that it is employed as a part of the cable draw mechanism with minimal expenditure of time and labor. Preferably, I provide in a cable draw mechanism, a pair of spaced apart arcuate members of low profile, said members being spaced apart by a plurality of radially fixed shafts each of which carry a plurality of spaced apart rollers. A plurality of vertical standards on the radially intermost of the arcuate members. A plurality of shafts extending transverse to the first shafts and carrying roller means whose axis is transverse to the axis first rollers. Preferably, each set of roller means is made up of a plurality of individual rollers which are independently movable so that there is no tie between the rollers and they can rotate independently. Means are provided on the radially outermost arcuate member for attaching a holding mechanism whereby the pull on the draw means can be equalized in a cable tray. The mechanism of this invention is placed in a cable tray with the innermost arcuate member bearing against the innermost arcuate sidewall of the tray and a cable is drawn across the rollers bearing on both the two transverse sets of roller members so that the pull of the cable bears always on a rolling member.

In the foregoing general discussion various objects, features, and advantages of the invention have been set forth. Other objects, features, and advantages of the invention will be more fully understood by reference to the following description and the accompanying drawings in which:

FIG. 1 is an isometric view of a section of cable tray illustrating a preferred form of my draw mechanism secured therein in the horizontal plane;

FIG. 2 is an enlarged isometric view of the cable draw mechanism alone; and

FIG. 3 is an enlarged isometric view of a section of cable tray showing the draw mechanism of FIG. 1 with an arrangement of cables being drawn.

Referring more particularly to the drawings and to the form of draw mechanism there illustrated, I have shown a conventional form of cable tray 10 having a curved portion made up of an inner arcuate member 11 and an outer arcuate member 12 separated by rungs 13. The draw mechanism 20 is made up of a similar inner arcuate member 21 and an outer arcuate member 22 spaced apart a distance sufficient to carry the largest cable to be drawn between the two members but less than the width of the cable tray. The two members are connected by shafts 23 which extend radially between the two members. Each of the shafts 23 is provided with a plurality of side by side independently rotating rollers 24. In addition, I preferably provide adjacent each end of the arcuate members a solid spacing member 25 spaced below the top of the rollers 24. Extending vertically above the inner arcuate member 21 of the draw mechanism are standards 26 which are adapted to carry shafts 27 lying transverse to the shafts 24. The shafts 27 carry a plurality of side by side rollers 28 which are independently rotatable. The draw mechanism 10 is used in the following manner.

The assembly is placed on the cable tray with the radially innermost arcuate member 21 bearing against the innermost arcuate member 11 of the cable tray. The cable to be drawn is then passed over the rollers 24 and against the rollers 28 as can be clearly seen in FIG. 3. The cable is then drawn through the entire system using a draw mechanism according to this invention as each curved point in the system. When the cable has been drawn, a sufficient amount of slack is drawn to permit the cable to be removed from the apparatus onto the tray as shown by the cables 31 and 32 in FIG. 3. When all of the cables have been drawn, the draw apparatus 20 is removed and the cables are arranged as desired on the tray bottom.

Where there is an excessive amount of thrust applied radially inwardly against the inner wall of the cable tray, during the drawing of the cable, stays may be attached to the rings 29 which extend radially outwardly from the outer arcuate member which stays may be attached to a part of the structure supporting the tray or to some other firm member capable of taking up a part of the thrust of the draw operation. Obviously the diameter of the various rollers and the radii of the arcuate members can be varied to suit the particular set of cable trays which are being used and to the particular cables which are being drawn.

From the foregoing description it is obvious that the draw mechanism of the present invention eliminates the problem of friction at each curve in the cable tray and permits the cable to be drawn through the tray with much greater ease and with much less labor than heretofore possible. Each of the independently rotatable rollers acts without interference from the next adjacent roller so that friction of the cable on the roller is much reduced and the mechanism can operate easily.

It will be understood that this invention may take various forms and embodiments and that it may be otherwise embodied and practiced within the spirit and scope of the following claims.

I claim:

A cable draw mechanism for cable trays having spaced side members and spaced transverse rungs comprising a pair of removable spaced apart arcuate members connected by spaced radial members, a plurality of side-by-side independent rollers rotatable on each of at least a part of said radial members, a plurality of vertical standards on the radially innermost of said arcuate members and a plurality of rollers on said standards on an axis transverse to the spaced radial members.

2. A cable draw mechanism as claimed in claim 1 wherein the radially outermost arcuate member is provided with spaced apart radially extending lugs.

3. A cable draw mechanism as claimed in claim 1 wherein the rollers on both the radial members and the vertical standards are independently rotatable with respect to one another.

4. A cable draw mechanism as claimed in claim 1 wherein the arcuate members are spaced apart a distance less than the width of a cable tray in which it is to be used.

* * * * *